July 21, 1964 R. W. HEATH 3,141,242
VERTICAL LEVEL
Filed May 24, 1962

INVENTOR.
ROSCOE W. HEATH.
BY
Willard S. Brown
ATTORNEY.

United States Patent Office 3,141,242
Patented July 21, 1964

3,141,242
VERTICAL LEVEL
Roscoe W. Heath, 940 Smith St., Tempe, Ariz.
Filed May 24, 1962, Ser. No. 197,518
4 Claims. (Cl. 33—215)

This invention pertains to leveling and plumbing devices and is particularly directed to a vertical level.

One of the objects of this invention is to provide a level of universal application to both horizontal and vertical surfaces.

Another object is to provide a level which is extremely accurate and versatile in use.

A further object is to provide a level that is extremely rugged and durable under rough handling and use.

It is also an object to provide a vertical pendulum level having a basic frame for precisely leveling horizontal surfaces and a separable pendulum unit for leveling vertical surfaces.

Further features and advantages of this invention will appear from a detailed description of the drawings in which.

Figure 3:
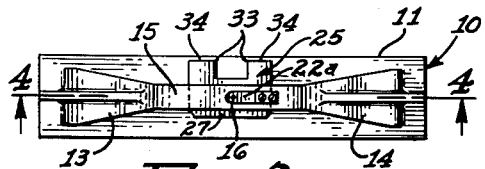
FIG. 3 is a plan view of the vertical level shown in FIG. 1.
Figure 1:
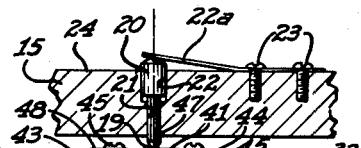
FIG. 1 is a front elevation of a vertical level incorporating the features of this invention.
Figure 1:
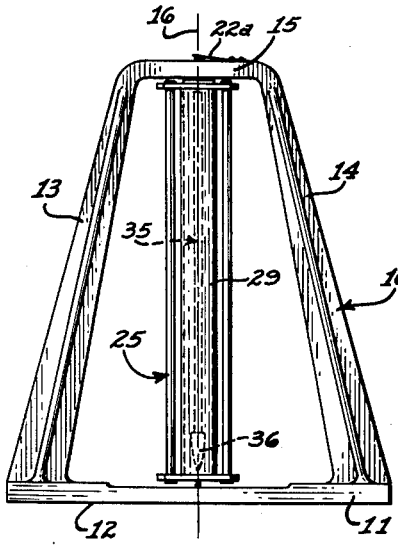
Figure 2:
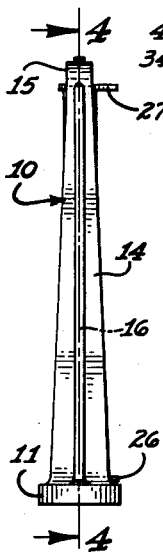
FIG. 2 is a side elevation of the vertical level shown in FIG. 1.

As an example of one embodiment of this invention there is shown a vertical level having a frame 10 comprising a base plate 11 having an accurately finished bottom surface 12 for placement upon horizontal surfaces to be leveled and plumbed. Formed integral with the ends of the base plate 11 are the upstanding converging pedestals 13 and 14 which are connected together at their upper ends by the cross bar 15. A vertical axis 16 perpendicular to the bottom surface 12 is established by the point 17 of the center pin 18 fixed in the base plate 11 and the point 19 of the center pin 20 axially slidable in the bore 21 and counterbore 22 formed in the cross bar 15. A leaf spring 22a fixed by screws 23 to the top surface 24 of the cross bar 15 serves to yieldingly normally axially urge the center pin 20 toward the center pin 18 in the base plate 11.

Mounted between the center pins 18 and 20 is the vertical level pendulum unit indicated generally at 25 comprising a pair of axially spaced U-shaped work contacting plates 26 and 27 having annular grooves 28 adapted to receive the ends of a transparent pendulum tube 29. Suitable draw bars 30 pass through bores 31 formed in the plates 26 and 27 and appropriate nuts 32 threaded on the ends of the draw bars 30 serve when tightened to rigidly lock the U-shaped work contacting plates 26 and 27 to the tube 29 with the work contacting points 33 and the work contacting surfaces 34 of the plates 26 and 27 in exact alignment.

The indicating element 35 of the device comprises a plumb bob member 36 having a tapered portion 37 terminating in an indicating point 38 on its lower end. The member 36 is fixed to the pendulum rod 39 having fixed in its upper end the swing pin 40. The swing pin 40 is provided with a ball portion 41 which is supported in the socket 42 formed in the socket piece 43. A top plate 44 is placed over the socket piece 43 and both plates are secured together by suitable screws 45 to the top surface 46 of the U-shaped plate 27. A conical center hole 47 is formed in the top surface 48 of the top plate 44 to receive the center pin 20 and a conical center hole 49 is formed in the bottom surface 50 of the U-shaped plate 26 located on the axis 16 of the device. A series of concentric indicating circles 51 and a dead level indicating point 52 on the axis 16 are scribed on the top surface 53 of the U-shaped plate 26 within the annular groove 28 and the tube 29.

Figure 5:
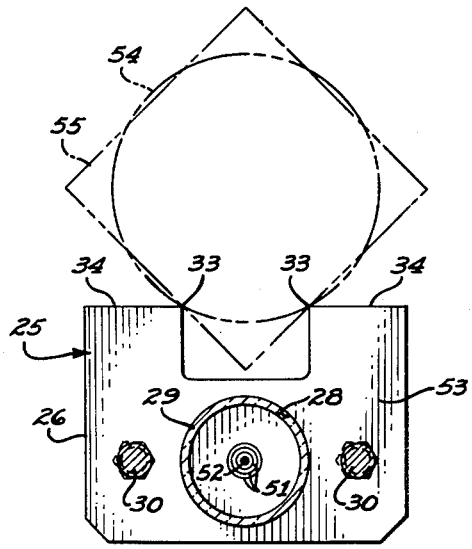
FIG. 5 is an enlarged horizontal cross section on the line 5—5 of FIG. 4.
Figure 4:
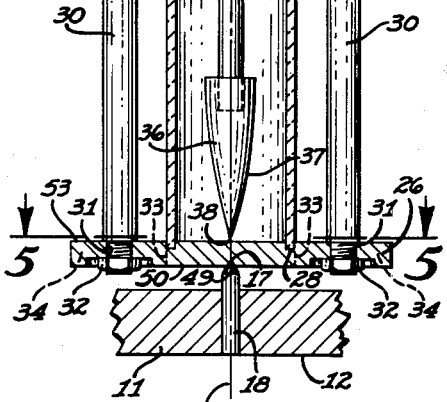
FIG. 4 is an enlarged fragmentary sectional view of the pendulum unit indicated by the line 4—4 of FIGS. 2 and 3.

In determining the level condition of a horizontal surface, the pendulum unit 25 is mounted on the centers 18 and 20 in the frame 10 with the bottom surface 12 resting on the surface to be checked. The ball joint 41–42 allows the free swinging pendulum to swing to exact vertical position while the point 38 indicates the amount and direction of plumb relative to the indicating circles 51 and dead level point 52. When the surface to be measured is adjusted so that the point 38 of the pendulum 36–39 is exactly over the point 52, the surface is dead level. When the device is to be used to check a round post 54 or a square post 55 for vertical plumb, the pendulum unit 25 is removed from the frame 10 by pushing the pendulum unit 25 upward against the yielding center pin 20, lifting the plate 26 off of the center 18 and then swinging the bottom of the pendulum outwardly of the frame to thus remove it for vertical testing. The unit 25 is placed either with points 33 or surfaces 34 against the vertical surfaces of the work 54 and 55 as required, FIG. 5.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters patent is:

1. A vertical level having in combination:
   (a) a frame,
   (b) a horizontal bottom surface on said frame,
   (c) and a pendulum unit demountably positioned vertically in said frame comprising:
   (d) a pendulum rod swingingly mounted in said pendulum unit,
   (e) a pointed plumb bob fixed on the lower end of said pendulum rod,
   (f) a series of concentric indicating circles on said pendulum unit positioned below the point of said plumb bob showing the degree of level of the surface being checked by said horizontal bottom surface,
   (g) and rigid transparent means surrounding said pendulum rod and plumb bob to isolate the same from the effect of air currents.

2. A vertical level having in combination:
   (a) a frame,
   (b) a horizontal bottom surface on said frame,
   (c) and a pendulum unit demountably positioned vertically in said frame comprising:
   (d) a pendulum rod swingingly mounted in said pendulum unit,
   (e) a pointed plumb bob fixed on the lower end of said pendulum rod,
   (f) a series of concentric indicating circles on said pendulum unit positioned below the point of said plumb bob showing the degree of level of the surface being checked by said horizontal bottom surface,
   (g) a rigid transparent means surrounding said pendulum rod and plumb bob to isolate the same from the effect of air currents,
   (h) and vertically and horizontally spaced locating surfaces on said pendulum unit applicable to vertical surfaces to be plumbed when said pendulum unit is detached from said frame.

3. A vertical level structure comprising in combination:
   (a) a frame having,
   (b) a base plate including,
   (c) a horizontal bottom surface applicable to horizontal surfaces to be plumbed,
   (d) upstanding converging pedestal members fixed to the ends of said base plate,
   (e) a cross bar fixed to the upper ends of said pedestal members,
   (f) an upwardly projecting center pin fixed intermediate the ends of said base plate,
   (g) a downwardly projecting center pin having its axis vertically aligned with the axis of said upwardly projecting center pin and vertically axially slidable intermediate the ends of said cross bar,
   (h) means on said cross bar to yieldingly normally urge said downwardly projecting center pin toward said upwardly projecting center pin,
   (i) the axes and points of said center pins defining a vertical axis perpendicular to said horizontal bottom surface on said frame,
   (j) and a demountable vertical level pendulum unit rotatably mounted on said center pins.

4. A vertical level structure comprising in combination:
   (a) a frame having,
   (b) a base plate including,
   (c) a horizontal bottom surface applicable to horizontal surfaces to be plumbed,
   (d) upstanding converging pedestal members fixed to the ends of said base plate,
   (e) a cross bar fixed to the upper ends of said pedestal members,
   (f) an upwardly projecting center pin fixed intermediate the ends of said base plate,
   (g) a downwardly projecting center pin having its axis vertically aligned with the axis of said upwardly projecting center pin and vertically axially slidable intermediate the ends of said cross bar,
   (h) means on said cross bar to yieldingly normally urge said downwardly projecting center pin toward said upwardly projecting center pin,
   (i) the axes and points of said center pins defining a vertical axis perpendicular to said horizontal bottom surface on said frame,
   (j) and a demountable vertical level pendulum unit mounted on said center pins including,
   (k) a pair of vertically axially spaced U-shaped work contacting plates,
   (l) a rigid transparent tube extending vertically between said plates,
   (m) means for securing said tube and plates together as a rigid unit,
   (n) a pendulum rod having a plumb bob point fixed to the lower end of said rod suspended within said transparent tube from the upper one of said U-shaped plates,
   (o) concentric indicating circles on the lower of said U-shaped plates within said transparent tube and immediately below the pointed end of said plumb bob to indicate the degree of plumb,
   (p) a conical center hole surface in the top of said upper U-shaped plate and in the bottom of said lower U-shaped plate for mounting said pendulum unit on said center pins of said frame,
   (q) and vertically and horizontally aligned work contacting areas on each of said U-shaped work contacting plates adapted to engage vertical surfaces to check the plumb thereof when said pendulum unit is removed from said center pin of said frame.

References Cited in the file of this patent
UNITED STATES PATENTS

| | | |
|---|---|---|
| 268,826 | Robertson | Dec. 12, 1882 |
| 2,184,505 | Danley | Dec. 26, 1939 |